Patented July 20, 1926.

1,593,304

UNITED STATES PATENT OFFICE.

CARL O. JOHNS, OF ROSELLE, NEW JERSEY, ASSIGNOR TO STANDARD DEVELOPMENT COMPANY, A CORPORATION OF DELAWARE.

ART OF DEODORIZING ISOPROPYL ALCOHOL.

No Drawing. Application filed August 17, 1921. Serial No. 493,135.

The deodorizing of isopropyl alcohol derived from the propylene contained in the gases from oil stills is rendered exceptionally difficult by reason of the minute proportions of impurities present and of the obscure nature of their composition. They appear to be complex sulfur compounds.

In accordance with the present invention such isopropyl alcohol may be deodorized in the following manner. The alcohol is boiled with charcoal containing adsorbed oxygen under a reflux condenser. The proportion of charcoal employed may suitably be as high as 5%; 1% has been found to be satisfactory under ordinary circumstances. After heating for a short period, say 15 minutes to 1 hour, the alcohol is distilled off and condensed.

The charcoal employed is preferably freshly activated, and its activation may suitably be accomplished by the customary outgassing methods; for example, by heating to red heat and passing steam under pressure or by successively heating the charcoal under vacuum and cooling, in vacua. It has been found that the charcoal is most effective when saturated with adsorbed oxygen. It is hence preferred to prepare the charcoal by heating it to a red heat and subsequently placing it in an atmosphere of oxygen or placing it in a conduit or tube through which oxygen is passed.

The alcohol and charcoal may suitably be heated in an autoclave, in which case the reflux condenser may be dispensed with.

I claim:—

1. The method of deodorizing isopropyl alcohol prepared from oil refinery gases which comprises heating such alcohol with charcoal containing adsorbed oxygen.

2. The method of deodorizing isopropyl alcohol prepared from oil refinery gases which comprises heating such alcohol with activated charcoal containing adsorbed oxygen.

3. The method of deodorizing isopropyl alcohol prepared from oil refinery gases which comprises boiling such alcohol with up to 5% of activated charcoal saturated with adsorbed oxygen, and subsequently distilling off the alcohol.

CARL O. JOHNS.